(12) United States Patent
Okada et al.

(10) Patent No.: US 9,080,921 B2
(45) Date of Patent: Jul. 14, 2015

(54) CALIBRATION METHOD FOR MULTI-COMPONENT FORCE MEASURING SPINDLE UNIT USED IN TIRE TESTING MACHINE

(75) Inventors: Toru Okada, Kobe (JP); Yasunori Kakebayashi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 797 days.

(21) Appl. No.: 13/200,401

(22) Filed: Sep. 23, 2011

(65) Prior Publication Data

US 2012/0079868 A1    Apr. 5, 2012

(30) Foreign Application Priority Data

Oct. 5, 2010   (JP) .................................. 2010-225715

(51) Int. Cl.
*G01L 25/00* (2006.01)
*G01M 17/02* (2006.01)

(52) U.S. Cl.
CPC ............. *G01L 25/00* (2013.01); *G01M 17/022* (2013.01)

(58) Field of Classification Search
CPC .............................. G01M 17/022; G01L 25/00
USPC .......................................................... 73/1.15
See application file for complete search history.

(56) References Cited

U.S. PATENT DOCUMENTS

| | | |
|---|---|---|
| 3,780,573 A | 12/1973 | Reus |
| 4,448,083 A | 5/1984 | Hayashi |
| 4,620,436 A | 11/1986 | Hirabayashi et al. |
| 4,821,582 A | 4/1989 | Meyer et al. |
| 5,329,818 A | 7/1994 | Frick et al. |
| 6,575,024 B2 * | 6/2003 | Sinnett ............................ 73/146 |

(Continued)

FOREIGN PATENT DOCUMENTS

| | | |
|---|---|---|
| CN | 1079298 A | 12/1993 |
| CN | 1841032 A | 10/2006 |
| JP | 48-040493 | 6/1973 |

(Continued)

OTHER PUBLICATIONS

Office Action in the Korean Intellectual Property Office for Korean Patent Application No. 10-2011-100693 mailed Dec. 17, 2012.

(Continued)

*Primary Examiner* — Peter Macchiarolo
*Assistant Examiner* — Alexander Mercado
(74) *Attorney, Agent, or Firm* — Studebaker & Brackett PC

(57) ABSTRACT

A transformation matrix used for finding actual loads acting on a tire can be reliably calibrated. Using the calibrated transformation matrix, the translation and moment loads exerted on the tire can be calculated with a high degree of accuracy in a multi-component force measuring spindle unit including two multi-component force measuring sensors on locations spaced-apart from each other along the axis direction of a spindle shaft. The calibration method includes a step of measuring loads exerted on the spindle shaft, a calculation step using a measured load vector including the loads obtained in the measurement step and the transformation matrix applied to the measured load vector, to find an actual load vector including actual loads on the tire. Before the calculation step, a calibration step determines the measured load vector under a plurality of linearly independent test conditions and calibrates the transformation matrix based on the determined measured load vector.

8 Claims, 9 Drawing Sheets

(56) References Cited

U.S. PATENT DOCUMENTS

| 2006/0213289 A1 | 9/2006 | Kjoller et al. |
| 2011/0000292 A1 | 1/2011 | Yoshikawa et al. |

FOREIGN PATENT DOCUMENTS

| JP | 52-133270 | 11/1977 |
| JP | 57-169643 | 10/1982 |
| JP | 11-108780 | 4/1999 |
| JP | 2003-004598 | 1/2003 |
| JP | 2006119000 A * | 5/2006 |
| JP | 2009-133680 | 6/2009 |
| JP | 4310365 B1 | 8/2009 |
| JP | 2009-204324 | 9/2009 |
| JP | 2009-222639 | 10/2009 |

OTHER PUBLICATIONS

Office Action in the Japanese Patent Office for Japanese Patent Application 2010-225715 mailed Nov. 20, 2012.

* cited by examiner

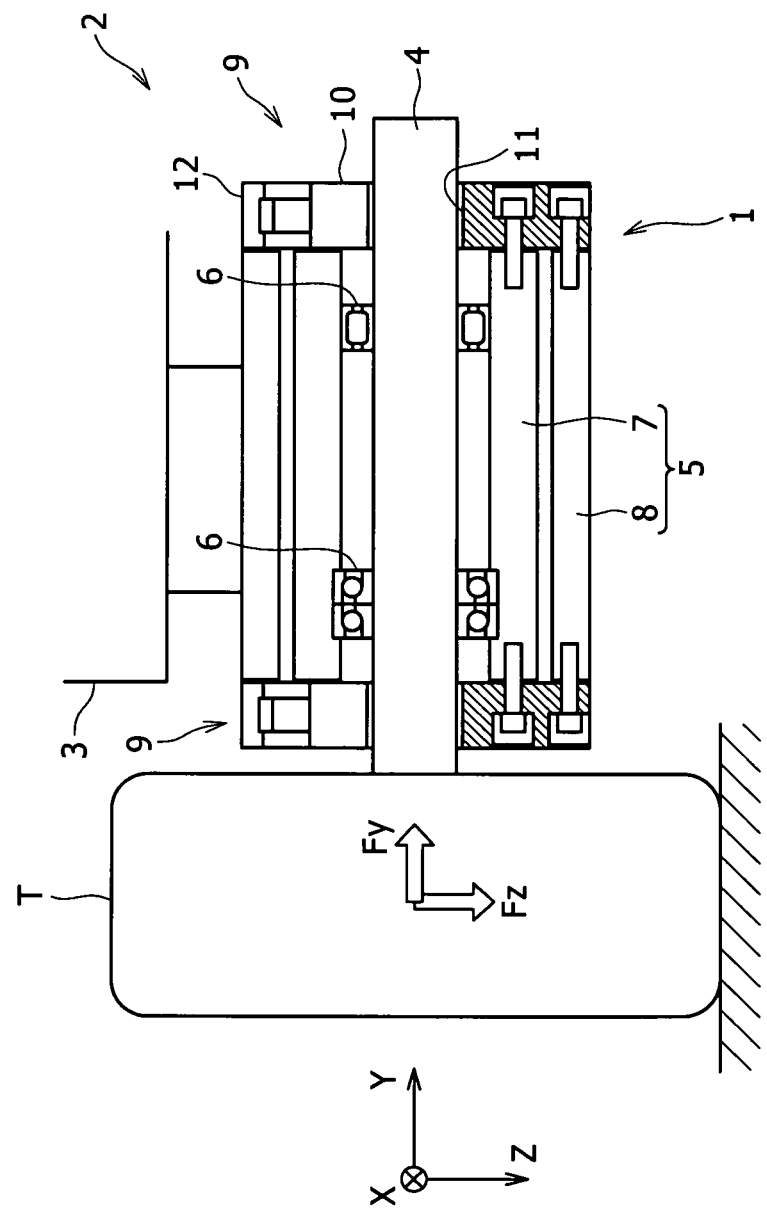

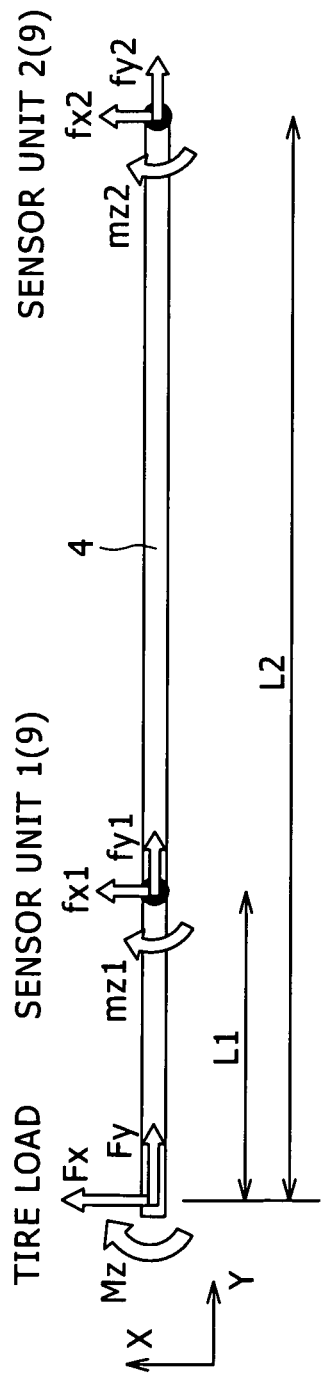

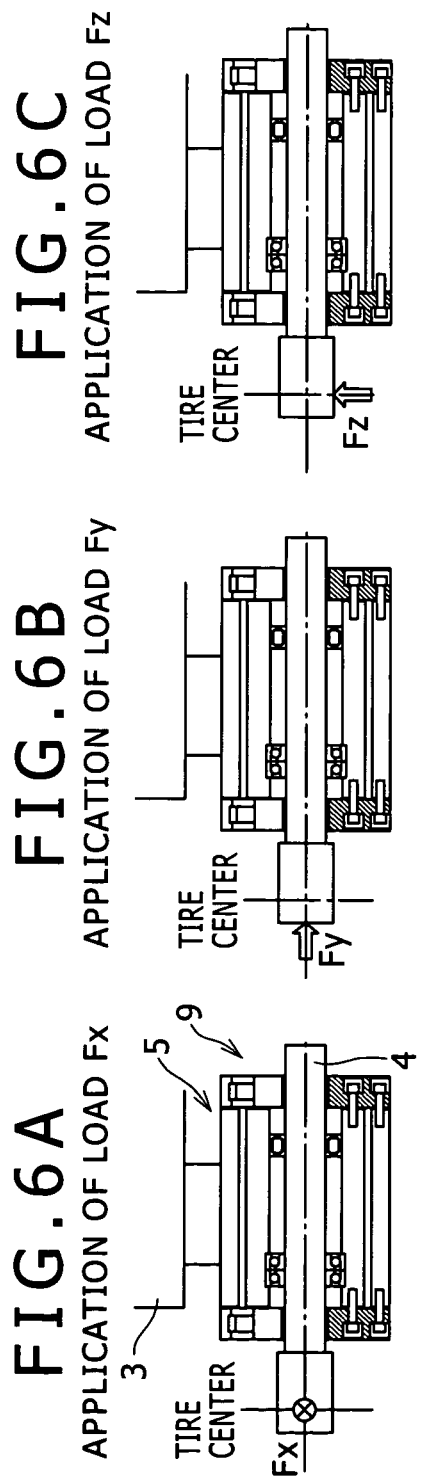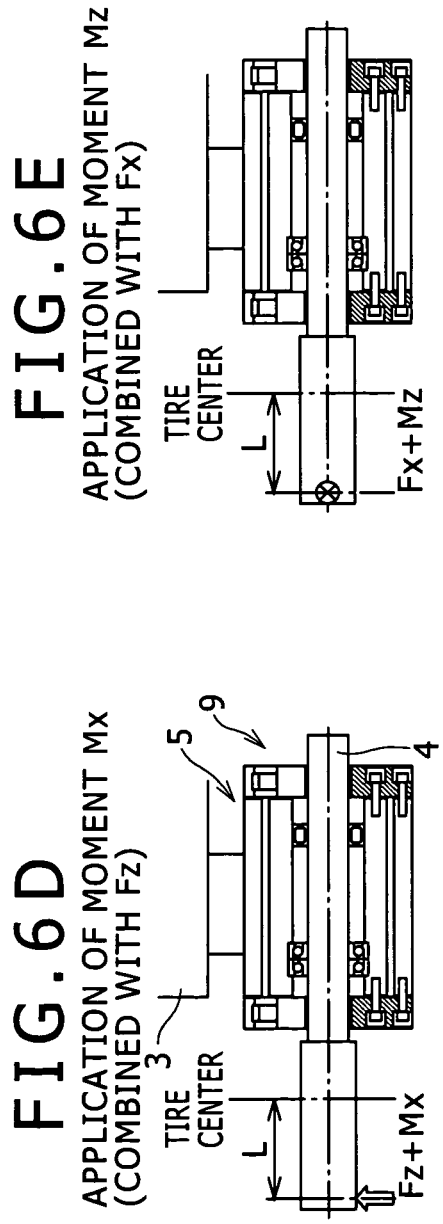

TEMPERATURE DISTRIBUTION IMMEDIATELY AFTER TIRE TEST

ENTIRE OUTER IS HEATED

OUTER TOP IS HEATED, OUTER BOTTOM IS COOLED

OUTER LATERAL END IS HEATED/COOLED

ERRORS IN Fx MEASUREMENT FOR LOAD Fx

ERRORS IN Fx MEASUREMENT FOR LOAD Fz (CROSS TALK)

CALIBRATION METHOD FOR MULTI-COMPONENT FORCE MEASURING SPINDLE UNIT USED IN TIRE TESTING MACHINE

BACKGROUND OF THE INVENTION

1. Field of the Invention

The present invention relates to a calibration method for a multi-component force measuring spindle unit used in a tire testing machine to calibrate the spindle unit which simultaneously measures, in a region of a support shaft of a tire to be measured, loads in a plurality of directions derived from the tire.

2. Description of the Related Art

Tire testing machines have been conventionally used to measure dynamic characteristics, such as, for example, a rolling resistance, of a tire in a running condition. Such a tire testing machine is equipped with a multi-component force measuring spindle unit which is adapted to rotatably support, on a spindle shaft, the tire to be measured, and capable of simultaneously measuring loads derived from the tire in a plurality of directions on a region of the spindle shaft.

The tire attached to the multi-component force measuring spindle unit is placed under a predetermined load on an outer circumference of a running drum installed in the tire testing machine, to simultaneously measure loads exerted in each direction on a spindle shaft under various conditions of a camber or slip angle of the tire, a grounding load, and other factors by means of "a multi-component force measuring sensor (a load cell)" installed in the multi-component force measuring spindle unit.

Then, an actual load acting on the tire is calculated from the measured load.

It should be noted that the term "load" as used herein shall include a moment. For example, when a direction along which a tire is pushed against the running drum is defined as a Z axis, a tire traveling direction is defined as an x axis, and a direction of an axis of a tire rotating shaft (a spindle shaft) is defined as a y axis, actual loads acting on the tire may include a tire grounding load Fz, a tire rolling resistance (tractive force) Fx, a tire lateral force (cornering force) Fy, a self-aligning torque Mz which is a turning moment about the z axis, an overturning moment Mx which is a turning moment about the x axis, and a rolling resistance moment My which is a turning moment about the y axis.

The "multi-component force measuring sensor" installed in the above-described multi-component force measuring spindle unit may have various structures, including those described in Japanese Patent Laid-Open Publication Nos. S57-169643-A (Patent Document 1) and S52-133270-A (Patent Document 2), and U.S. Pat. No. 4,821,582 (Patent Document 3).

For example, when a spindle unit employing a load cell as disclosed in Patent Document 1 is used, it becomes possible to measure six components of force resulting from a tire on the spindle shaft. However, in the spindle unit disclosed in Patent Document 1, because a tire load is exerted on a position deviated from a main body of a multi-component force measuring sensor, it is feared that a moment exerted on the multi-component force measuring sensor is increased, resulting in a situation where a sufficient load-carrying capacity is not obtained.

On the other hand, multi-component force measuring sensors described in Patent Document 2 and Patent Document 3 are able to overcome the problem associated with the multi-component force measuring sensor of Patent Document 1.

More specifically, in spindle units of Patent Documents 2 and 3, two multi-component force measuring sensors are disposed at a predetermined distance from each other along an axis direction of a spindle shaft. In particular, according to a structure of the spindle unit in Patent Document 3 in which the two multi-component force measuring sensors are coupled through a cylindrical member (a sleeve) having high stiffness, a moment or other forces exerted on the multi-component force measuring sensors can be reduced, and a sufficient load-carrying capacity can be accordingly obtained.

In the thus-constructed spindle unit, however, both translation and rotation are constrained between the two multi-component force measuring sensors. In other words, the spindle unit is in a statically indeterminate state or an excessively constrained state. As a result, when a tire test is conducted, measured loads obtained by the two multi-component force measuring sensors can not be determined simply from a balancing condition of an external force, and will be influenced by a condition of a deflection or a deflection angle which is determined based on a stiffness relationship between the cylindrical member and the multi-component force measuring sensors.

Although it can be considered that the multi-component force measuring sensors are integrally constructed with the cylindrical member to reduce an effect (adverse effect) as described above, the integral construction presents problems such as an increase in manufacturing cost or an increase in complexity of maintenance procedures. As long as they are structured as separate units, ease of maintenance, such as a capability of continuous use achieved only by replacing a defective part can be ensured, which is an extremely advantageous feature.

Further, because the two multi-component force measuring sensors and the cylindrical member have high stiffness in the excessively constrained state, the structure of the spindle unit as described in Patent Documents 2 and 3 has a problem of susceptibility to heat.

In fact, the spindle unit as described above suffers from a great internal force generated inside the unit by occurrence of even a slightest amount of thermal strain. More specifically, bearings that support the spindle shaft become a source of heat, and the heat is transferred to the entire unit, creating a certain distribution of temperature. As a result, the spindle unit will be deformed, and such thermal deformation of the spindle unit has an effect of forcing deformation on the multi-component force measuring sensors and causing the multi-component force measuring sensors to output a load which is not associated with the tire load. Thus, the effect emerges as an error in measurement.

In the structure of the spindle unit, as described above, including the two multi-component force measuring sensors which are disposed on positions spaced-apart from each other along the axis direction of the spindle shaft and respectively attached to the cylindrical member or the like, the influence of excessive constraint or thermal deformation may create a situation in which accurate measurement of the loads (such as a translational load and a moment) acting on the tire is difficult.

As a means for circumventing the situation, it is extremely effective to calibrate the multi-component force measuring spindle unit (to conduct a calibration test) prior to a tire test.

SUMMARY OF THE INVENTION

Then, in view of the aforesaid current problems, the present invention advantageously provides a calibration method for a multi-component force measuring spindle unit, the calibration method allowing the multi-component force measuring spindle unit equipped with two multi-component force measuring sensors which are disposed on locations spaced-apart from each other along an axis direction of a spindle shaft to measure, with a high degree of accuracy, a translation load and a moment acting on a tire.

In order to provide the method, the following technical means is employed in this invention.

A calibration method for a multi-component force measuring spindle unit according to the present invention is applied to a tire testing method that comprises a "measurement step" in which the multi-component force measuring spindle unit including a spindle shaft on which a test tire can be mounted, a housing for rotatably supporting the spindle shaft via a bearing unit, and two multi-component force measuring sensors which are disposed on locations spaced-apart from each other along an axis direction of the spindle shaft, fixed to the housing, and capable of measuring a load exerted on the spindle shaft is used to measure the load exerted on the spindle shaft, and a "calculation step" in which a measured load vector consisting of the measured loads obtained in the measurement step is used along with a transformation matrix applied to the measured load vector, to thereby find an actual load vector consisting of actual loads acting on the tire. Further, the calibration method comprises, prior to the calculation step, a "calibration step" of determining the measured load vector under a plurality of linearly independent test conditions, and calibrating the transformation matrix based on the determined measured load vector.

According to the abode described means, calibration of the multi-component force measuring spindle unit, i.e. calibration of the transformation matrix used for finding the actual loads acting on the test tire can be reliably performed, which, in turn, allows the multi-component force measuring spindle unit to measure, with a high degree of accuracy, the actual loads acting on the test tire.

Preferably, the two multi-component force measuring sensors may be adapted to be capable of measuring at least a three-degree-of-freedom translation load exerted on the spindle shaft, and the calculation step may comprise selecting, based on a plurality of output values obtained from the two multi-component force measuring sensors, the measured load vector consisting of m components, and applying the transformation matrix to the selected measured load vector, to thereby calculate the actual load vector consisting of n components (n<m) selected from the actual loads acting on the tire. Further, the calibration step may comprise applying an actual load vector whose components are all known and/or applying a change in temperature to the multi-component force measuring spindle unit in such a manner that m linearly independent test conditions are established, determining the measured load vector based on the output values obtained, under the conditions, from the two multi-component force measuring sensors, calculating the transformation matrix which relates the determined measured load vector to the actual load vector whose components are all known, and defining the calculated transformation matrix as the transformation matrix for use in the calculation step.

According to the above-described means, not necessarily all output values of the two multi-component force measuring sensors should be used for finding n loads (in n directions) acting on the test tire, yet only m output values may be adequately used.

For example, when it is desired to find only "n=2" loads (Fx, Mz) acting on the test tire, the loads can be found basically by using only output values fx1 and fx2 from the multi-component force measuring sensors (Mz is represented by a liner combination of the values Fx1 and fx2).

However, due to an error in assembly of the multi-component force measuring spindle unit, an error in attaching the multi-component force measuring spindle unit to a main body of the test machine (an alignment error), or other errors, a load in a z axis direction may have an influence on (may crosstalk with) the output values fx1 and fx2 in some cases. In these cases, outputs values fz1 and fz2 can be used to improve accuracy in measurement of the tire loads. When the outputs values fz1 and fz2 are used, the measured load vector will consist of m=4 components, and it is required to conduct, in the calibration step, a test in which loads Fz and Mx are independently applied in addition to the test in which known loads Fx and Mz are applied. Although a combination of the above-described four loads may be used, the test should be conducted using at least four combinations of the loads, each combination having a different ratio of the loads. Values of loads Fz and Mx used for calibration may be unknown. On the other hand, in a case where a load is also exerted in an Fx or Mz direction when the loads Fz and Mx are applied, the load in the Fx or Mz direction should be known.

Further the two multi-component force measuring sensors may be adapted to be capable of measuring at least a three-degree-of-freedom translation load exerted on the spindle shaft and measuring at least a moment about a tire traveling direction and a moment about a tire loading direction. The calculation step may comprise selecting, based on a plurality of output values obtained from the two multi-component force measuring sensors, the measured load vector consisting of m components, and applying the transformation matrix to the selected measured load vector, to thereby calculate the actual load vector consisting of n components (n<m) selected from the actual loads acting on the tire. Meanwhile, the calibration step may comprise applying an actual load vector whose components are all known and/or applying a change in temperature to the multi-component force measuring spindle unit in such a manner that m linearly independent test conditions are established, determining the measured load vector based on the output values obtained, under the conditions, from the two multi-component force measuring sensors, calculating the transformation matrix which relates the determined measured load vector to the actual load vector whose components are all known, and defining the calculated transformation matrix as the transformation matrix for use in the calculation step.

As such, when the multi-component force measuring sensor is a six component force sensor capable of measuring a moment load in addition to the three-degree-of-freedom translation load (or the sensor may be a five component force sensor without having the capability of measuring the moment about the axis direction of the spindle shaft), mutual interference of the all-direction loads including the moment can be previously corrected, to thereby allow the calculation of the actual tire load without performing the calibration on the multi-component force measuring spindle unit itself. In addition, because a greater number of measured loads can be obtained, it is possible to realize the calibration method for the multi-component force measuring spindle unit, which allows highly accurate measurement of the actual loads (the translation loads and the moment) exerted on the tire.

Here, the calculation step may comprise selecting, based on the plurality of output values obtained from the two multi-component force measuring sensors, the measured load vector (fx1, fx2, fz1, fz2, fy1+fy2) consisting of five components, and applying a transformation matrix to the selected measured load vector, to thereby find the actual load vector consisting of n components (n≤5) selected from the actual loads (Fx, Fy, Fz, Mx, Mz) acting on the tire, while the calibration step may comprise applying the actual load vector whose components are all known and/or applying the change in temperature to the multi-component force measuring spindle unit in such a manner that five linearly independent test conditions are established, and determining the measured load vector based on the output values obtained, under the conditions, from the two multi-component force measuring sensors, and calculating the transformation matrix (a 5 by n matrix or an n by 5 matrix) which relates the determined measured load vector to the actual load vector whose components are all known.

According to the above-described means, two sets (fx1, fy1, fz1) and (fx2, fy2, fz2) of translation load components from the two multi-component force measuring sensors can be used to determine, in the calibration test, the transformation matrix which relates the measured load vector consisting of five components (fx1, fx2, fz1, fz2, fy1+fy2) to the actual load vector (Fx, Fy, Fz, Mx, Mz) acting on the tire, and the actual load vector can be calculated from the measured load vector based on the determined transformation matrix.

More specifically, in the spindle unit having the statically indeterminate structure in which the two multi-component force measuring sensors are fixed to the housing, a component mz measured by the multi-component measuring sensors are generally expressed by a linear combination of components fx1 and fx2, while a component mx is also expressed by a linear combination of components fz1 and fz2. Therefore, calculation of the actual load of the tire using the transformation matrix determined in the calibration test does not necessarily require a moment component. Meanwhile, because components fy1 and fy2 associated with the component Fy are not structurally independent of each other, the component fy to be output from the multi-component force sensors shall be collectively treated as (fy1+fy2) in the present invention.

A one-to-one correspondence can be obtained between the five components of the measured load vector and the five components of the actual load vector for the tire by selecting and combining the measured load as described above. With this as a basis, an accurate transformation matrix can be positively obtained (because an inverse matrix can be obtained for the 5 by 5 transformation matrix) by conducting, under the five linearly independent test conditions, the calibration test in which the tire load having the known components is related to the measured load from the multi-component force measuring sensors.

Because the component My merely indicates a value of rolling friction of the bearings that support the spindle shaft in the multi-component force measuring spindle unit of this invention, it is considered that the component My as the actual load of the tire is insignificant. Measurement of the component My can be obtained, if desired, by finding a sum of values my1 and my2 respectively output by the multi-component force measuring sensors. Further, in the calibration test performed on the multi-component force measuring spindle unit, a sum (my1+my2) is used based on the concept the same as that of the component Fy.

Still further, the calculation step may comprise selecting, based on the plurality of output values obtained from the two multi-component force measuring sensors, the measured load vector (fx1, fx2, fz1, fz2, fy1+fy2, mx1, mx2, mz1, mz2) consisting of nine components, and applying a transformation matrix to the selected measured load vector, to thereby find the actual load vector (Fx, Fy, Fz, Mx, Mz) consisting of five components selected from the actual loads acting on the tire, while the calibration step may comprise applying the actual load vector whose components are all known and/or applying the change in temperature to the multi-component force measuring spindle unit in such a manner that nine linearly independent test conditions are established, and determining the measured load vector based on the output values obtained, under the conditions, from the two multi-component force measuring sensors, and calculating the transformation matrix (a 9 by 5 matrix or a 5 by 9 matrix) which relates the determined measured load vector to the actual load vector whose components are all known.

The above means is to perform calibration on components mx1, mx2, mz1, and mz2 which are output from the two multi-component force measuring sensors. In the multi-component force measuring spindle unit according to the present invention, there is no correlation between the moment m and the load f in the output value from the multi-component force measuring sensor associated with deformation due to thermal strain resulting from the distribution of increased temperatures in the unit, which means that the moment m and the load f are linearly independent. Therefore, according to the above-described means, the effect of measurement errors caused by the distribution of temperature can be reduced. In the calibration step, the three-degree-of-freedom translation load and the two-degree-of-freedom moment are independently exerted on a location of the tire, while the loads caused by various distributions of temperature are treated as calibration data, to thereby establish at least nine linearly independent conditions. Then, the transformation matrix can be calculated using the data obtained under the at least nine linearly independent conditions.

Moreover, the calculation step may comprise selecting, based on the plurality of output values obtained from the two multi-component force measuring sensors, the measured load vector (fx1, fx2, fz1, fz2, fy1, fy2, mx1, mx2, mz 1, mz2) consisting of ten components, and applying a transformation matrix to the selected measured load vector, to thereby find the actual load vector (Fx, Fy, Fz, Mx, Mz) consisting of five components selected from the actual loads acting on the tire, while the calibration step may comprise applying the actual load vector whose components are all known and/or applying the change in temperature to the multi-component force measuring spindle unit in such a manner that ten linearly independent test conditions are established, and determining the measured load vector based on the output values obtained, under the conditions, from the two multi-component force measuring sensors, and calculating the transformation matrix (a 10 by 5 matrix or a 5 by 10 matrix) which relates the determined measured load vector to the actual load vector whose components are all known.

The above-described means is a method for separately adding components fy1 and fy2 to the components of the measured load vector. When a greater number of variables are independently used, the transformation matrix can be created with a higher degree of accuracy. Data obtained under at least ten linearly independent conditions can be used to calculate the transformation matrix. It should be noted that the use of the greater number of variables might create difficulty in obtaining appropriate calibration data in some cases, resulting in a situation where the determined translation matrix is of inferior properties. Accordingly, caution should be exercised in this method using the greater number of variables.

In addition, the calculation step preferably comprises selecting, based on the plurality of output values obtained from the two multi-component force measuring sensors, the measured load vector (fx1, fx2, fz1, fz2, fy1, fy2, mx1, mx2, my1, my2, mz1, mz2) consisting of twelve components, and applying a transformation matrix to the selected measured load vector, to thereby find the actual load vector (Fx, Fy, Fz, Mx, Mz) consisting of five components selected from the actual loads acting on the tire, while the calibration step preferably comprises applying the actual load vector whose components are all known and/or applying the change in temperature to the multi-component force measuring spindle unit in such a manner that twelve linearly independent test conditions are established, and determining the measured load vector based on the output values obtained, under the conditions, from the two multi-component force measuring sensors, and calculating the transformation matrix (a 12 by 5 matrix or a 5 by 12 matrix) which relates the determined measured load vector to the actual load vector whose components are all known.

The above-described means is a method of adding components my1 and my2 to the components of the measured load vector. When a greater number of variables are independently used, the transformation matrix can be created with a higher degree of accuracy. Data obtained under at least twelve linearly independent conditions can be used to calculate the transformation matrix. It should be noted that the use of the greater number of variables might create difficulty in obtaining appropriate calibration data in some cases, resulting in a situation where the determined translation matrix is of inferior properties. Accordingly, caution should be exercised in this method using the greater number of variables.

Note that when the component My is inserted as a component of the actual load vector of the tire, the transformation matrix will be of a 6 by 12 array.

Using the technique according to this invention, the transformation matrix used for finding the actual loads acting on the tire can be reliably calibrated in the multi-component force measuring spindle unit including the two multi-component force measuring sensors disposed on locations spaced-apart from each other along the axis direction of the spindle shaft, which in turn enables highly accurate calculation of both the translation load and the moment exerted on the tire by means of the calibrated transformation matrix.

BRIEF DESCRIPTION OF THE DRAWINGS

FIG. 1 shows a structure of a multi-component force measuring spindle unit according to an embodiment of the present invention;

FIG. 3 is a model diagram showing a relationship between measured loads from the multi-component force measuring sensors and tire loads;

FIGS. 6A to 6E show loading conditions in a calibration test for the multi-component force measuring spindle unit;

DESCRIPTION OF THE PREFERRED EMBODIMENTS

Figure 2A:
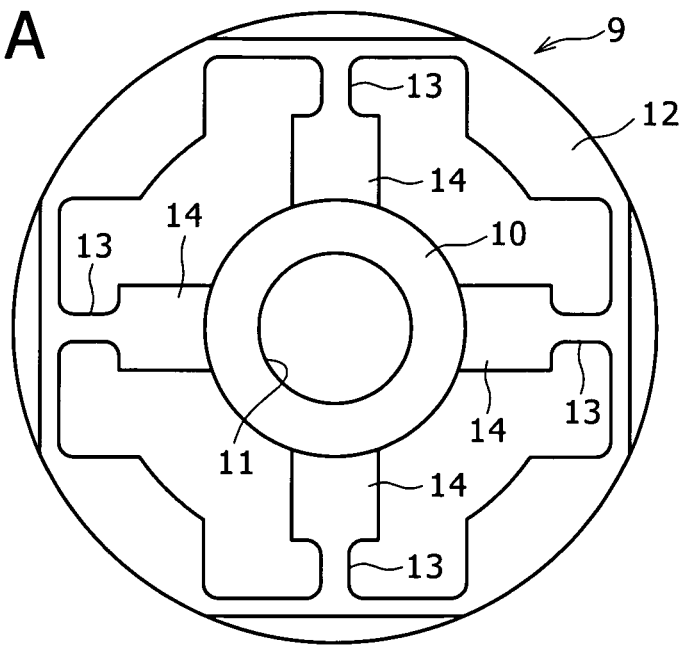
FIG. 2A is a front view of a multi-component force measuring sensor (a load cell)

A preferred embodiment of this invention will be described with reference to the drawings. It should be noted that, in the description below, identical components are identified with the same reference numerals. The identical components have the same designations and functions, and detailed descriptions related to those components will not be repeated.

FIG. 1 shows a schematic structure of a multi-component force measuring spindle unit 1 according to an embodiment of this invention. The multi-component force measuring spindle unit 1 of this embodiment, which partially constitutes a tire testing machine 2 for measuring dynamic characteristics such as a rolling resistance of a tire T in a running state, is attached to a frame 3 of the tire testing machine 2.

The multi-component force measuring spindle unit 1 includes a spindle shaft 4 which integrally rotates along with the test tire T mounted on an end of the spindle shaft 4. The spindle shaft 4 is movably fitted in a housing 5 with an axis of the spindle shaft 4 arranged along a horizontal direction, and rotatably supported via a bearing unit (bearings) 6 by the housing 5.

More specifically, the housing 5 of the multi-component force measuring spindle unit 1 has a two-tier cylindrical structure in which the spindle shaft 4 is horizontally inserted in a cylindrically-shaped inner sleeve 7 (an inner cylinder body) disposed so as to have a horizontally aligned axis, and rotatably supported via the bearing unit 6 by the inner sleeve 7. The inner sleeve 7 is coaxially inserted in a cylindrical outer sleeve 8 (an outer cylinder body) which is greater in diameter than the inner sleeve 7. The inner sleeve 7 and the outer sleeve 8 are substantially equal in length in an axial direction, and connected at their respective ends to each other through load cells 9 (multi-component force measuring sensors) having a disc-shaped outer appearance. The thus-constructed multi-component force measuring spindle unit 1 is attached, using the outer sleeve 8 thereof, to the frame 3 of the tire testing machine 2.

Manufacturing costs can be reduced by separately constructing the load cells 9 and the housing 5 as described above rather than integrating them into a one-piece unit. Further, the use of separate and distinct two load cells 9 can provide a capability of conducting a calibration test only with the load cells 9 before assembling the spindle unit 1 to the apparatus. Then, based on measured load from which mutual interference solely between the load cells 9 is removed, the calibration test can be conducted again using the entire spindle unit 1, to thereby reduce the mutual interference further.

FIG. 2 show the load cell 9, i.e. a multi-component force measuring sensor.

The load cell 9 in this embodiment has outer appearance shaped like a disc, and includes a ring-shaped force receiving body 10 located at the center of the load cell 9. An opening 11 formed in the center of the force receiving body 10 is designed to receive the spindle shaft 4 passing therethrough in a movably fitted state. A ring-shaped fixing body 12 is disposed on a radial outside of the force receiving body 10. The force receiving body 10 and the fixing body 12 are coaxially formed and connected to each other by multiple (four) beam members (strain induced bodies) 13 extending along a radial direction.

The force receiving body 10 is firmly coupled to the inner sleeve 7 with a fastening member such as a bolt, so that a force is transmitted in the following sequence of the spindle shaft 4→ the bearing unit 6→ the inner sleeve 7→ the force receiving member 10. In addition, the fixing body 12 is also firmly coupled to the outer sleeve 8 by means of the fastening member such as a bolt, which allows the spindle shaft 4, the inner sleeve 7, the outer sleeve 8, and the load cells 9 to be installed as a resultant integrated unit constituting the multi-component force measuring spindle unit 1.

Figure 2B:
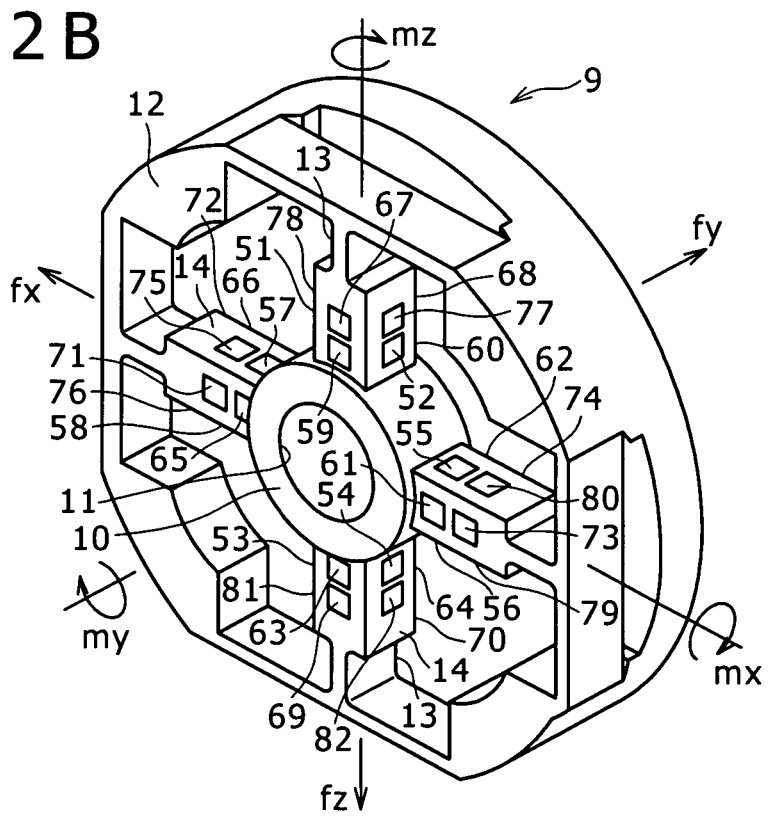
FIG. 2B is a perspective view of the multi-component force measuring sensor.

As shown in FIG. 2B, a detector section 14 is composed of strain gauges 51 to 82 attached to the strain induced bodies 13. Here, the strain gauges 51 to 66 are designed to measure a translation load, while the strain gauges 67 to 82 are designed to measure a moment.

For example, when a load fx is exerted on the force receiving body 10 along an x axis direction, vertically extending strain induced bodies 13 is subjected to a bending deformation in a plane of a drawing sheet of FIG. 2A, and a strain of the bending deformation is detected by the strain gauges 51 to 54 and converted into a measured load fx. In a case of a measured load fz, the bending occurs in laterally extending strain induced bodies 13. When a measured load fy is exerted, the four strain induced bodies 13 are bendingly deformed along a direction passing through a drawing sheet of FIG. 2B. On the other hand, when a moment mx is exerted on the force receiving body 10, the laterally extending strain induced bodies 13 are twisted, while the vertically extending strain induced bodies 13 are bendingly deformed along the direction passing through the drawing sheet. This bending moment is detected by the strain gauges 67 to 70 attached to the vertically extending strain induced bodies 13. The laterally extending strain induced bodies 13 are bent when a moment mz is exerted, while all of the four strain induced bodies 13 are deformed along an in-plane direction of the drawing sheet when a moment my is exerted.

As can be seen from FIG. 2B, the load cell 9 functions as a three component force sensor capable of measuring translation loads in x, y, and z directions, and also functions as a five component force sensor capable of measuring moments about x and z axes in addition to the translation load, or as a six component force sensor further capable of measuring a moment about a y axis because two load cells 9 (which are collectively referred to as a "load cell 9") are disposed on locations spaced-apart from each other along the axis direction of the spindle axis 4 in the multi-component force measuring spindle unit 1 of this embodiment. Therefore, the multi-component force measuring spindle unit 1 according to this embodiment is able to measure two sets of loads and moments including, for each set, at least three-degree-of-freedom translation loads fx, fy, and fz acting on the spindle shaft 4 and at least a moment mx about a tire T traveling direction (the x axis) and a moment mz about a tire T loading direction (the z axis) acting on the spindle shaft 4.

In the multi-component force measuring spindle unit 1 having the above-described structure, the load or moment produced by the test tire T is transmitted to the spindle shaft 4 on which the tire T is mounted, and further transmitted from the spindle shaft 4→ the bearing unit 6→ the inner sleeve 7→ the force receiving body 10 of the load cell 9, as described above. Upon transmission to the force receiving body 10, a measured load is obtained by the detecting section 14 of the load cell 9 (a measurement step).

Next, a technique for calculating an actual load (an actual load vector) acting on the tire T from the measured load (a measured load vector) obtained by the detecting section 14 of the load cell 9 (a calculation step) will be described.

When the translation load or the moment is exerted on the spindle shaft 4 on which the test tire T is mounted, bending, shearing, or twisting deformation is caused in the strain induced bodies 13 of the load cell 9, and an amount of the deformation (an amount of strain) is detected by the load cell 9 to which the strain induced bodies 13 are attached, and subsequently output as a measured load.

For convenience of illustration, the following explanation is provided with reference to a "simplified model in an x-y plane" shown in FIG. 3.

Loads measured by the load cell 9 disposed on a side close to the tire T along the spindle shaft 4 are defined as fx1, fy1, and mx1, while loads measured by the load cell 9 disposed on a side away from the tire T are defined as fx2, fy2, and mx2. Here, actual loads Fx, Fy, and Mx acting on the tire T can be expressed by the following Equation (1).

[Equation 1]

$$F_x = f_{x1} + f_{x2}, F_y = f_{y1} + f_{y2}, M_z = m_{x1} + m_{x2} - L_1 f_{x1} - L_2 f_{x2} \quad (1)$$

The above-described relationship may be extended and arranged with respect to the loads Fz, Mx, and My as shown in the following Equation (2).

[Equation 2]

$$\begin{pmatrix} F_x \\ F_y \\ F_z \\ M_x \\ M_y \\ M_z \end{pmatrix} = \begin{pmatrix} 1 & 0 & 0 & 0 & 0 & 0 & 1 & 0 & 0 & 0 & 0 & 0 \\ 0 & 1 & 0 & 0 & 0 & 0 & 0 & 1 & 0 & 0 & 0 & 0 \\ 0 & 0 & 1 & 0 & 0 & 0 & 0 & 0 & 1 & 0 & 0 & 0 \\ 0 & 0 & L_1 & 1 & 0 & 0 & 0 & 0 & L_2 & 1 & 0 & 0 \\ 0 & 0 & 0 & 0 & 1 & 0 & 0 & 0 & 0 & 0 & 1 & 0 \\ -L_1 & 0 & 0 & 0 & 0 & 1 & -L_2 & 0 & 0 & 0 & 0 & 1 \end{pmatrix} \times \begin{pmatrix} F_{x1} \\ F_{y1} \\ F_{z1} \\ M_{x1} \\ M_{y1} \\ M_{z1} \\ F_{x2} \\ F_{y2} \\ F_{z2} \\ M_{x2} \\ M_{y2} \\ M_{z2} \end{pmatrix} \quad (2)$$

The loads acting on the tire T can be calculated with precision using Equation (2) as long as calibration performed only on the load cell 9 is reliably completed. When Equation (2) is used, it is an indispensable condition that each of the load cells 9 be a multi-component force measuring sensor capable of measuring a moment. Note that because the moment My about the y axis corresponds to a force of rolling friction of the bearing, and is not always needed, it is not necessarily required for each load cell 9 to output my1 and my2.

However, in the structure having the two load cells 9 disposed on the locations spaced-apart from each other along the axis direction of the spindle shaft 4 as achieved in the multi-component force measuring spindle unit 1 of the present invention, there may be a case, depending on machining accuracy, errors in assembly, and/or features of joint parts, in which the calibration singly performed on each load cell 9 using Equation (2) can not ensure a sufficient degree of accuracy in measurement.

More specifically, the two load cells 9 are connected through members (of the inner sleeve 7 and the outer sleeve 8) having high stiffness in the multi-component force measuring spindle unit 1, and accordingly brought into a statically indeterminate state where translation and rotation are constrained between the two load cells 9, i.e. an excessively constrained state. As a result, when the tire T load is exerted, the load or moment detected in the two load cells 9 cannot be simply determined from a balancing condition of an external force, while the measured loads obtained from the load cells 9 will be also influenced by a condition of a deflection or a deflection angle which is determined from a stiffness relation between the sleeve and a multi-shaft load cell 9.

Although the load cells 9 may solely have a structure that minimizes mutual interference (cross talk) of the measured loads, a problem remains in that mutual interference of the loads can occur in the spindle unit 1 as a whole depending on a shape error or an assembly error and on a state of the joint parts, leading to an increased possibility of having an error in measurement.

Moreover, the highly rigid and excessively constrained state also leads to another problem of susceptibility to heat. Even a slightest thermal strain can create a high internal force inside the spindle unit 1. The bearing unit 6 for supporting the spindle shaft 4 becomes a source of heat, and the heat is transferred to the entire unit, while creating a distribution of temperature. As a result, the spindle unit 1 will be deformed, and such thermal deformation of the spindle unit 1 has an effect of forcing deformation on the load cells 9 and causing the load cells 9 to measure a load which is not associated with the tire T load. Thus, the effect emerges as an error in measurement. In addition, when the load cell 9 is a three component force sensor without having a capability of outputting a moment, Equation (2) cannot be applied.

In view of the above-described circumstances, it is necessary to perform a calibration test (calibration operation) on the load cell 9 and therefore the multi-component force measuring spindle unit 1.

A "calibration method for a multi-component force measuring spindle unit" which is a characteristic technique of the present invention will be described below.

<Calibration Test1>

Firstly, it is assumed that a relationship between the measured value obtained in the load cell 9 and an acting force exerted on the tire T is transformed using a transformation matrix E as shown in Equation (3). Each component of this transformation matrix E is obtained from a calibration test.

[Equation 3]

$$\begin{pmatrix} F_x \\ F_y \\ F_z \\ M_x \\ M_z \end{pmatrix} = \begin{pmatrix} e_{11} & e_{12} & e_{13} & e_{14} & e_{15} \\ e_{21} & e_{22} & e_{23} & e_{24} & e_{25} \\ e_{31} & e_{32} & e_{33} & e_{34} & e_{35} \\ e_{41} & e_{42} & e_{43} & e_{44} & e_{45} \\ e_{51} & e_{52} & e_{53} & e_{54} & e_{55} \end{pmatrix} \times \begin{pmatrix} f_{x1} \\ f_{x2} \\ f_{z1} \\ f_{z2} \\ f_{y1} + f_{y2} \end{pmatrix} = E \times \begin{pmatrix} f_{x1} \\ f_{x2} \\ f_{z1} \\ f_{z2} \\ f_{y1} + f_{y2} \end{pmatrix} \quad (3)$$

In Equation (3), the transformation matrix E can be determined by giving at least five known loads which are of linear independence as a tire actual load. That is, when a matrix consisting of tire actual load vectors obtained under each test condition is taken as F, and a matrix consisting of measured load vectors detected by the load cell 9 under the test condition is taken as X, the transformation matrix E can be calculated using the following Equation (4).

[Equation 4]

$$F = EX \Rightarrow E = FX^{-1} \quad (4)$$

Further, a least squares method using an increased number of load conditions is effectively employed to calculate the transformation matrix E with a higher degree of accuracy. In this case, the number of columns in the matrices F and X is 5 or more. Because an inverse matrix of the matrix X is not determined, calculation is performed using a pseudo matrix as shown in the following equation which is equivalent to the least squares method.

[Equation 5]

$$F = EX \Rightarrow EXX^T = FX^T \Rightarrow EXX^T(XX^T)^{-1} = FX^T(XX^T)^{-1}E$$
$$\Rightarrow FX^T(XX^T)^{-1} \quad (5)$$

Here, the load conditions for the above calculation should include at least linearly independent five data elements. In this regard, whether or not the linearly independent experiment data includes 5 elements can be determined by calculating the rank of the matrix X consisting of the experiment data. The rank may be obtained through singular value decomposition of the matrix X or the like.

Next, the reason why the load fy of the load cell 9 is treated as (fy1+fy2) will be described.

As can be estimated from FIG. 3, there is no independent relationship between components fy1 and fy2 output from the load cells 9 (the components are loads occurring along the axis of the spindle shaft 4, and inseparable from each other). The actual tire load Fy is distributed in a ratio determined based on the load of the load cells 9 in the y direction and a longitudinal stiffness of the inner sleeve 7. When the components fy1 and fy2 are separately treated in calculation of the transformation matrix using Equations (4) and (5), it is not possible to find the inverse matrix or a pseudo inverse matrix because the matrix X consisting of the loads of the load cells 9 is not linear independent. As is evident from Equation (2), the actual tire load Fy, which is expressed as a combination (fy1+fy2) of the measured loads from the load cells 9, can be also written in the form of a sum in Equation (3).

Next, the reason why the moment loads existing in Equation (2) are eliminated in the calibration test 1 of this embodiment will be described.

As described above, the multi-component force measuring spindle unit 1 of this embodiment has the structure which is statically indeterminate with respect to the loads of the load cells 9 in the x and z directions. This prevents the loads of the two load cells 9 from being determined simply based on a balancing condition of the external force, and creates a need to also use, for calculating the loads, the relationship between the external force and the deflection or the deflection angle determined from the stiffness of the load cells 9 and other components.

Figure 4:
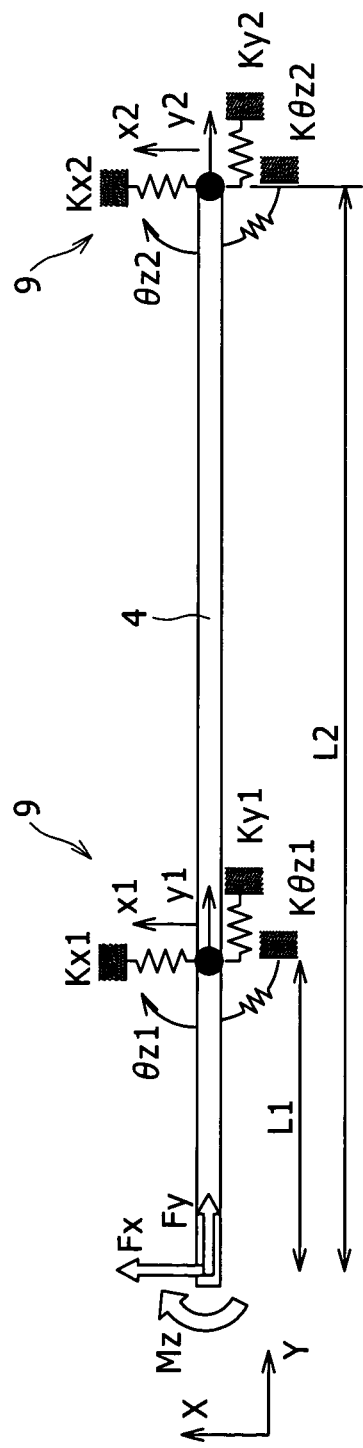
FIG. 4 is a model diagram showing a relationship between measured loads from the multi-component force measuring sensors and the tire loads (including stiffness of the multi-component force measuring sensors)

FIG. 4 is a model diagram showing the above-described situation. In the diagram, loads occurring in an x-y plane are only shown for simplicity. Here, taking flexural stiffness of a beam as infinity for simplicity of explanation, a relationship between a displacement and a rotation angle of each load cell 9 can be expressed by the following Equation (6).

[Equation 6]

$$\theta_{z1} = \theta_{z2}, \; \theta_{z1} = \frac{x_1 - x_2}{L_2 - L_1} \quad (6)$$

Meanwhile, a relationship among the displacement, the load, and the moment can be expressed using a spring stiffness of each load cell 9 by the following Equation (7).

[Equation 7]

$$f_{x1} = k_{x1}x_1, f_{x2} = k_{x2}x_2, m_{x1} = k_{\theta z1}\theta_{z1}, m_{x2} = k_{\theta z2}\theta_{z2} \quad (7)$$

Based on Equations (4) and (5), the moments mz1 and mz2 can be expressed as shown in Equation (8), and accordingly found to be linearly-combined with fx1 and fx2. That is, the moments are not linearly independent.

[Equation 8]

$$m_{z1} = \frac{k_{\theta z1}}{L_2 - L_1}\left(\frac{1}{k_{x1}}f_{x1} - \frac{1}{k_{x2}}f_{x2}\right),$$
$$m_{z2} = \frac{k_{\theta z2}}{L_2 - L_1}\left(\frac{1}{k_{x1}}f_{x1} - \frac{1}{k_{x2}}f_{x2}\right) \quad (8)$$

Therefore, when both the load f and the moment m are added to the matrix X consisting of the loads of the load cell 9, the matrix X is not to be linearly independent as similarly as the component fy, which makes it impossible to determine an inverse matrix of the matrix X. In this regard, it is possible, in theory, that the transformation matrix can be determined by adding only components mx and mz to Equation (3) in place of the components fx and fz of the load cells 9. However, in the structure of the spindle unit in which the two load cells 9 are installed to increase moment stiffness, the moments exerted on each load cell 9 itself are relatively small (i.e. outputs from the strain gauges are small) with respect to the translation loads. For improvement in accuracy, use of the f component is effective.

It should be noted that because the spindle shaft 4, the inner sleeve 7, and the outer sleeve 8 (corresponding to base stiffness of springs for each load cell 9 in FIG. 4) are, in practice, no rigid bodies, flexural stiffness EI of those components are contained in Equation (6). Although a relationship between the f component and the m component of the load cell 9 varies depending on a magnitude relation between the stiffness of the load cell 9 and the flexural stiffness of the sleeve, a linear combination property will not be changed.

<Calibration Test 2>

Hereinafter, another calibration test according to this embodiment will be described.

In Calibration Test 2, it is assumed that a relationship between measured values obtained from the load cells 9 and the acting forces exerted on the tire T is transformed using a 5 by 9 transformation matrix E as shown in Equation (9). Each element in the transformation matrix E is determined by the calibration test.

[Equation 9]

$$\begin{pmatrix} F_x \\ F_y \\ F_z \\ M_x \\ M_z \end{pmatrix} = \begin{pmatrix} e_{11} & e_{12} & e_{13} & e_{14} & e_{15} & e_{16} & e_{17} & e_{18} & e_{19} \\ e_{21} & e_{22} & e_{23} & e_{24} & e_{25} & e_{26} & e_{27} & e_{28} & e_{29} \\ e_{31} & e_{32} & e_{33} & e_{34} & e_{35} & e_{36} & e_{37} & e_{38} & e_{39} \\ e_{41} & e_{42} & e_{43} & e_{44} & e_{45} & e_{46} & e_{47} & e_{48} & e_{49} \\ e_{51} & e_{52} & e_{53} & e_{54} & e_{55} & e_{56} & e_{57} & e_{58} & e_{59} \end{pmatrix} \times \begin{pmatrix} f_{x1} \\ f_{x2} \\ f_{z1} \\ f_{z2} \\ f_{y1}+f_{y2} \\ m_{x1} \\ m_{x2} \\ m_{z1} \\ m_{z2} \end{pmatrix} = E \times \begin{pmatrix} f_{x1} \\ f_{x2} \\ f_{z1} \\ f_{z2} \\ f_{y1}+f_{y2} \\ m_{x1} \\ m_{x2} \\ m_{z1} \\ m_{z2} \end{pmatrix} \quad (9)$$

At least nine loading conditions are needed to find the transformation matrix E in Equation (9). The transformation matrix E can be calculated using a pseudo inverse matrix technique shown in the following equation.

[Equation 10]

$$F=EX \Rightarrow EXX^T=FX^T \Rightarrow EXX^T(XX^T)^{-1}=FX^T(XX^T)^{-1}$$
$$\Rightarrow E=FX^T(XX^T)^{-1} \quad (10)$$

Figure 5A:
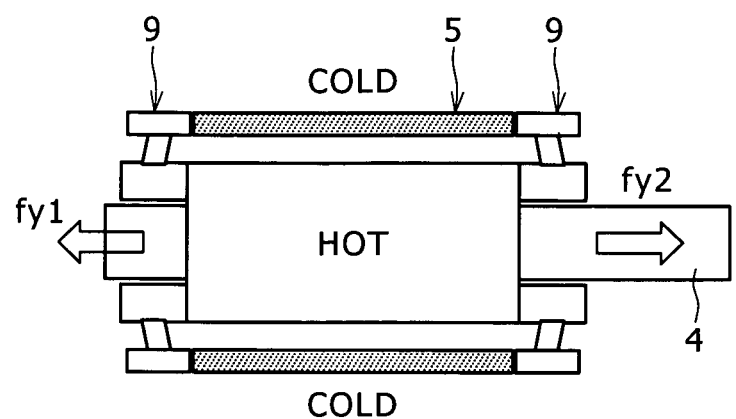
FIGS. 5A and 5B are diagrams showing internal force conditions produced by distribution of temperature in the multi-component force measuring spindle unit.
Figure 5B:
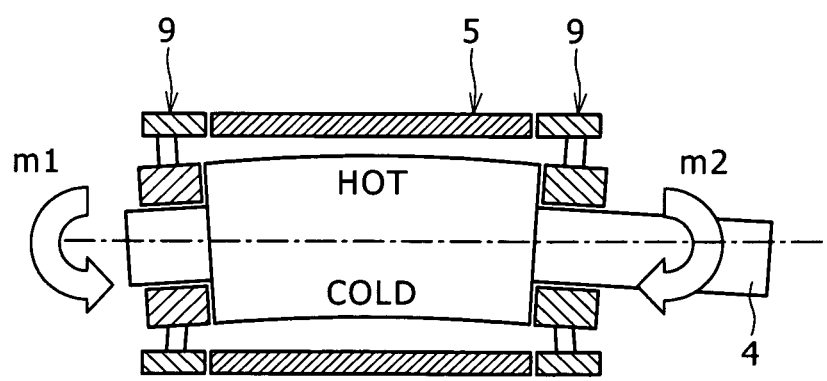

In the multi-component force measuring spindle unit 1, as shown in FIG. 5, the measured loads f and m obtained from the load cells 9 in response to the internal force resulting from thermal deflection due to the distribution of temperature in the unit is related to the internal force in a way which is written by a relational expression different from that of Calibration Test 1. Because an internal force state as shown in FIG. 5 cannot be created by the tire T load, the relational expression varies depending on the internal force state, which means that the components m and f are linearly independent with respect to a change in internal force. A calibration equation (Equation (9)) in which moments output from the load cells 9 are inserted can be used to reduce an influence of the distribution of temperature and the like exerted on the error in measurement. Calibration test data obtained by measuring independent three-degree-of-freedom translation and two-degree-of-freedom moment loads at the location of the tire T in various states of temperature distribution and treating the measured loads as a calibration data group that may be used to calculate the transformation matrix.

In this calibration test, whether or not experiment data is composed of nine linearly independent elements can be evaluated, as described above, by calculating the rank of the matrix X consisting of the experiment data elements (rank calculation).

<Calibration Test 3>

Further, still another calibration test according to this embodiment will be described below.

In Calibration Test 3, it is assumed that the relationship between the measured values obtained from the load cells 9 and the acting force exerted on the tire T is transformed as shown in Equation (11) using a 5 by 10 transformation matrix E. Each element of the transformation matrix E is determined through the calibration test.

[Equation 11]

$$(F_x F_y F_z M_x M_z)^T = E \cdot (f_{x1} f_{x2} f_{z1} f_{z2} f_{y1} f_{y2} m_{x1} m_{x2} m_{z1} m_{z2})^T \quad (11)$$

In this calibration test, external force and internal force (temperature influence) conditions are given in such a manner that ten linearly independent loads for the load cell 9 are output as the measured load to be detected by the load cell 9. To produce independent loads for elements fy1 and fy2, an internal force such as generation of an internal temperature should be created. This can be achieved by introducing a difference in temperature between the inner sleeve 7 and the outer sleeve 8.

<Calibration Test 4>

Then, a further calibration test according to this embodiment will be described.

In Calibration Test 4, the relationship between the measured values obtained by the load cells 9 and the acting force exerted on the tire T is transformed using a 5 by 12 transformation matrix E as shown in Equation (12). Each element of the transformation matrix E is obtained through the calibration test.

[Equation 12]

$$(F_x F_y F_z M_x M_z)^T = E \cdot$$
$$(f_{x1} f_{x2} f_{y1} f_{y2} f_{z1} f_{z2} m_{x1} m_{x2} m_{y1} m_{y2} m_{z1} m_{z2})^T \quad (12)$$

In this calibration test, the above transformation matrix E is used only when linearly independent load outputs of statistical significance can be obtained for elements my1 and my2. Meanwhile, accuracy can be improved by adding a condition expressed by the following Equation (13) to the calibration data group having been obtained by giving a variety of independent loading conditions in the above-described states of temperature distribution.

[Equation 13]

$$my1=1, my2=-1 \text{ when } (Fx,Fz,Mx,My,Mz)=0 \qquad (13)$$

Equation (13), which is formulated with respect to the y axis direction, denotes that even though an internal force in the y direction (such as expansion and contraction, or twist of the inner sleeve 7) are produced without application of an external force, a load caused by the internal force symmetrically appears as action and reaction forces on the load cell 9 located close to the tire T and the load cell 9 located away from the tire T. When the above conditional expression is included, identification accuracy of the transformation matrix E contained in Equation (11) can be improved, and the load acting on the tire T can be calculated from the loads output by the two load cells 9 with a high degree of accuracy under various conditions in tests.

<Result of Calibration Test>

Finally, results obtained by performing the above-described method of calibrating the multi-component force measuring spindle unit 1 will be described.

Firstly, the result of conducting Calibration Test 1 is explained.

In Calibration Test 1, five test conditions as shown in FIGS. 6A to 6E are given to conduct the test. More specifically, loading states in Calibration Test 1 include a condition of applying a load Fx (tractive force) shown in FIG. 6A, a condition of applying a load Fy (tire T axis load) shown in FIG. 6B, a condition of applying a load Fz (vehicle body load) shown in FIG. 6C, a condition of applying a moment Mx shown in FIG. 6D, and a condition of applying a moment Mz shown in FIG. 6D.

The moments Mx and My are given as combined loads achieved by exerting the loads Fz and Fx, respectively, on a position situated at an L distance from the center of the tire T attached to the spindle shaft 4. A value of Mx is equal to L×Fz, while a value of Mz is equal to L×Fx.

Figure 7A:
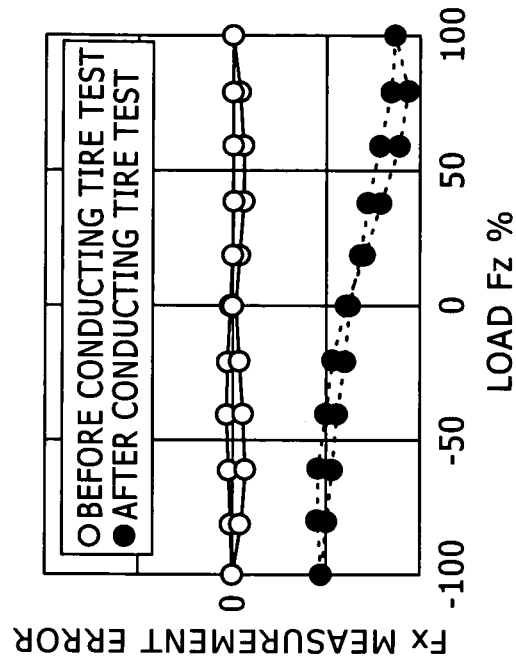
FIGS. 7A and 7B show results of the calibration tests conducted according to the present invention (using a 5 by 5 transformation matrix)
Figure 7B:
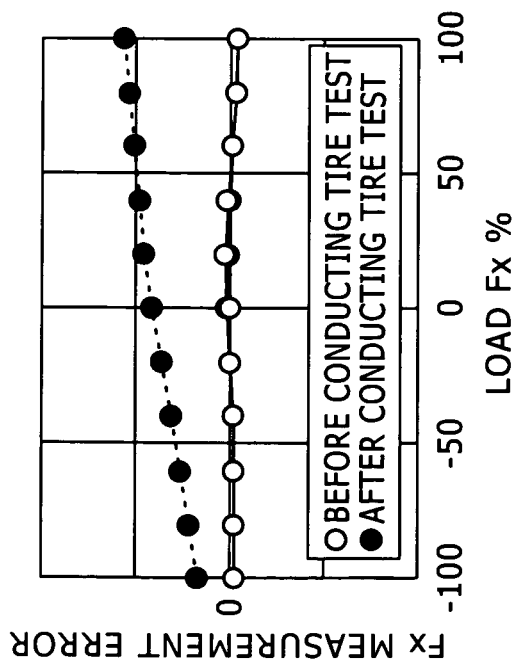

FIG. 7 show Fx and Fz measurement accuracy as a verification result of the accuracy in measuring the actual loads acting on the tire T.

From open circles ○ in FIG. 7 representing errors in measuring the load Fx after conducting Calibration Test 1, it can be recognized that almost no errors have developed in measurement of both of the loads, whereby effectiveness of the 5 by 5 calibration equation has been confirmed. Thereafter, a tire test was conducted, and the errors in measuring the load Fx were again determined immediately after the tire test. The resulting errors are indicated by filled circles ●. As is evident from a graph plotted by the filled circles ●, an accuracy verification test conducted immediately after completion of the tire test have revealed that large errors were introduced. The errors are believed to be caused under the influence of the internal force resulting from the distribution of temperature in the spindle unit 1. The distribution of temperature is due to heat which is generated in the bearing unit 6 by rotating the tire T in a state where the load Fz of a drum is applied.

Figure 8A:
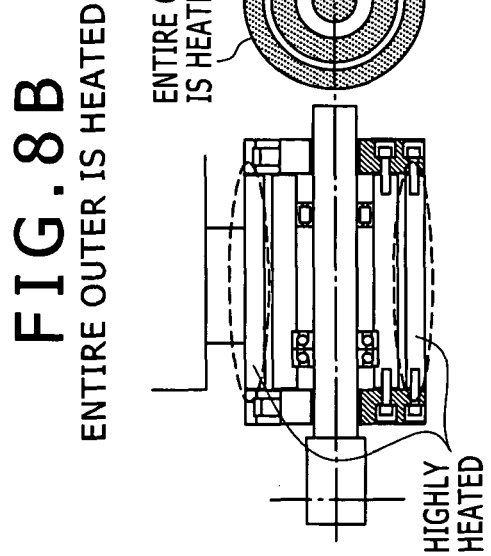
FIGS. 8A to 8D show distribution of temperature in the calibration test for the multi-component force measuring spindle unit.
Figure 8B:
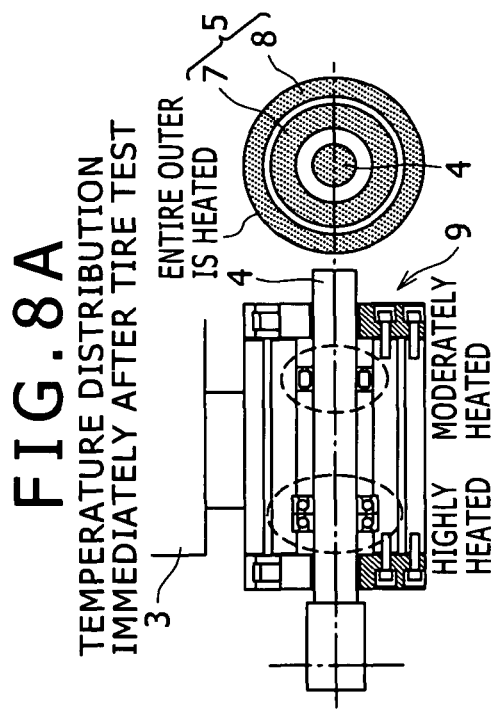
Figure 8C:
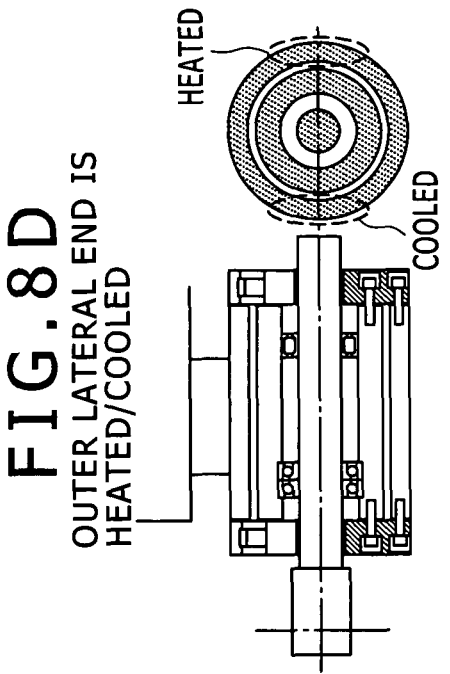
Figure 8D:
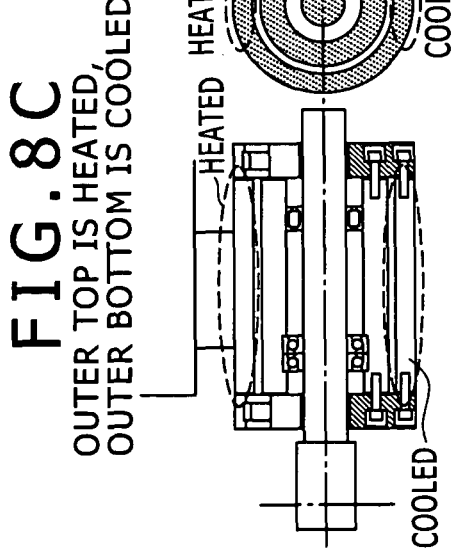

With this in view, Calibration Test 2 was conducted in four different states of temperature distribution created as shown in FIGS. 8A to 8D. The states of temperature distribution consist of a condition of temperature distribution obtained immediately after the tire test as shown in FIG. 8A, a condition that the entire outer sleeve 8 is heated as shown in FIG. 8B, a condition that a top region is heated while a bottom region is cooled in the outer sleeve 8 as shown in FIG. 8C, a condition that one of the lateral ends of the outer sleeve 8 is heated while the other of the lateral ends is cooled as shown in FIG. 8D.

In Calibration Test 2, the transformation matrix with a 5 by 9 array was used, and a total of nine conditions were employed as test conditions, including five load conditions shown in FIGS. 6A to 6E and four conditions of temperature distribution shown in FIGS. 8A to 8D.

Figure 9A:
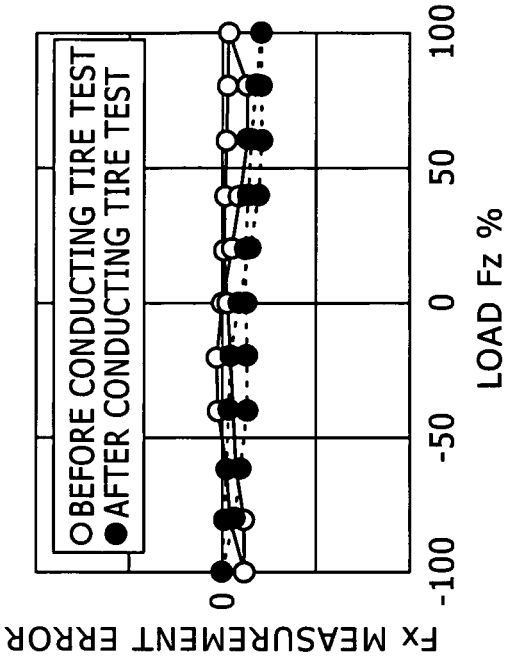
FIGS. 9A and 9B show results of the calibration tests conducted according to the present invention (using a 5 by 9 transformation matrix).
Figure 9B:
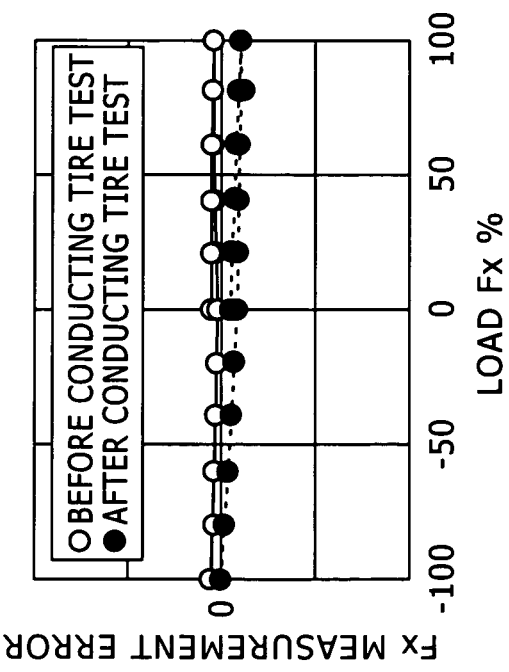

FIG. 9 show the results of Calibration Test 2. From open circles ○ in FIG. 9, representing errors in measuring the load Fx after conducting Calibration Test 2, it has been confirmed that the loads have almost no errors in measurement. Thereafter, the tire test was conducted, and the errors in measuring the load Fx were again determined immediately after the tire test. The resulting errors are indicated by filled circles ●. As is evident from a graph plotted by the filled circles ●, an accuracy verification test conducted immediately after completion of the tire test has revealed that almost no errors are introduced in measurement of the loads even after the temperature distribution is created in the spindle unit 1. This is because Calibration Test 2 has been conducted.

As has been described above, through the use of the technique according to the present invention, the transformation matrix E used for finding the actual loads acting on the tire T can be reliably calibrated, and using the calibrated transformation matrix E, the translation and moment loads exerted on the tire T can be calculated with a high degree of accuracy in the multi-component force measuring spindle unit 1 including the two multi-component force measuring sensors disposed on locations spaced-apart from each other along the axis direction of the spindle shaft.

The embodiment disclosed herein should be construed in every respect as being illustrative, but not restrictive. The present invention is defined by the appended claims rather than by the foregoing description, and intended to embrace all changes and modifications that fall within the scope of the claims either literally or under the doctrine of equivalents.

For example, although the calibration equations illustrated in the embodiment are described based on values of strain signals output from the load cell 9 and converted into the loads or the moments, it is desirable for an actual load computation that an matrix used for converting the strain signals output from the load cells 9 into the loads or the moments and the matrix E used for converting the load cell load into the tire load according to the present invention are preliminarily combined into a single matrix. In this way, the tire load can be directly derived from the strain signal from the load cells 9, which can contribute to reduction of a cancellation error arising during calculation as well as shortening of calculation time.

What is claimed is:

1. A calibration method for a multi-component force measuring spindle unit applied to a tire testing method,
    wherein the tire testing method comprises:
        a measurement step in which the multi-component force measuring spindle unit including a spindle shaft on which a test tire is adapted to be mounted, a housing for rotatably supporting the spindle shaft via a bearing unit, and two multi-component force measuring sensors which are disposed on locations spaced apart from each other along an axial direction of the spindle shaft, fixed to the housing, and capable of measuring loads exerted on the spindle shaft is used to measure the load exerted on the spindle shaft, and
        a calculation step in which a measured load vector consisting of the measured loads obtained in the measurement step is used along with a transformation matrix applied to the measured load vector, to thereby find an actual load vector consisting of actual loads acting on the tire, that comprises selecting, based on a plurality of output values obtained from the two multi-component force measuring sensors, the measured load vector consisting of five components fx1, fx2, fz1, fz2 and fy1+fy2, and applying a transformation matrix to the selected measured load vector, to thereby find the actual load vector consisting of n components where n<5 is/are selected from components of the actual loads (Fx, Fy, Fz, Mx, Mz) acting on the tire, where fx1, fy1, and fz1 are components of the measured loads in an x axis direction, a y axis direction, and a z axis direction, respectively, which are obtained from one of the two multi-component force sensors, and fx2, fy2, and fz2 are components of the measured loads in the x, y, and z axis directions, respectively, which are obtained from the other one of the two multi-component force sensors, where the x axis direction is a tire traveling direction, the y axis direction is in the axial direction of the spindle shaft, and the z-axis direction is a tire loading direction, and wherein the calibration method comprises:

prior to the calculation step, a calibration step of applying the actual load vector whose components are all known to the multi-component force measuring spindle unit in such a manner that five linearly independent test conditions are established, and determining the measured load vector based on the plurality of output values obtained, under the conditions, from the two multi-component force measuring sensors, and calculating the transformation matrix, defined as at least one of a 5 by n matrix and an n by 5 matrix, which relates the determined measured load vector to the actual load vector whose components are all known, and defining the calculated transformation matrix as the transformation matrix for use in the calculation step, wherein the two multi-component force measuring sensors are adapted to be capable of measuring at least a three-degree-of-freedom translation load exerted on the spindle shaft.

2. The calibration method according to claim 1, further comprising: applying a change in temperature to the multi-component force measuring spindle unit in such a manner that the five linearly independent test conditions are established.

3. A calibration method for a multi-component force measuring spindle unit applied to a tire testing method, wherein the tire testing method comprises:

a measurement step in which the multi-component force measuring spindle unit including a spindle shaft on which a test tire is adapted to be mounted, a housing for rotatably supporting the spindle shaft via a bearing unit, and two multi-component force measuring sensors which are disposed on locations spaced apart from each other along an axial direction of the spindle shaft, fixed to the housing, and capable of measuring loads exerted on the spindle shaft is used to measure the load exerted on the spindle shaft, and a calculation step in which a measured load vector consisting of the measured loads obtained in the measurement step is used along with a transformation matrix applied to the measured load vector, to thereby find an actual load vector consisting of actual loads acting on the tire, that comprises selecting, based on a plurality of output values obtained from the two multi-component force measuring sensors, the measured load vector consisting of nine components fx1, fx2, fz1, fz2, fy1+fy2, mx 1, mx2, mz1 and mz2, and applying a transformation matrix to the selected measured load vector, to thereby find the actual load vector consisting of five components (Fx, Fy, Fz, Mx, Mz) selected from the actual loads acting on the tire, where fx1, fy1, and Fz1 are components of the measured loads in an x axis direction, a y axis direction, and a z axis direction, respectively, which are obtained from one of the two multi-component force sensors, and fx2, fy2, and fz2 are components of the measured loads in the x, y, and z axis directions, respectively, which are obtained from the other one of the two multi-component force sensors, where mx1 and mz1 are components of moments about the x and z axis directions, respectively, which are obtained from the one of the two multi-component force sensors, and mx2 and mz2 are components of moments about the x and z axis directions, respectively, which are obtained from the other one of the two multi-component force sensors, where the x axis direction is a tire traveling direction, the y axis direction is in the axial direction of the spindle shaft, and the z axis direction is a tire loading direction, and wherein the calibration method comprises:

prior to the calculation step, a calibration step of applying the actual load vector whose components are all known to the multi-component force measuring spindle unit in such a manner that nine linearly independent test conditions are established, and determining the measured load vector based on the plurality of output values obtained, under the conditions, from the two multi-component force measuring sensors, and calculating the transformation matrix, defined as at least one of a 9 by 5 matrix and a 5 by 9 matrix, which relates the determined measured load vector to the actual load vector whose components are all known, wherein the two multi-component force measuring sensors are adapted to be capable of measuring at least a three-degree-of-freedom translation load exerted on the spindle shaft and measuring at least a moment about a tire traveling direction and a moment about a tire loading direction.

4. The calibration method according to claim 3, further comprising: applying a change in temperature to the multi-component force measuring spindle unit in such a manner that the nine linearly independent test conditions are established.

5. A calibration method for a multi-component force measuring spindle unit applied to a tire testing method, wherein the tire testing method comprises:

a measurement step in which the multi-component force measuring spindle unit including a spindle shaft on which a test tire is adapted to be mounted, a housing for rotatably supporting the spindle shaft via a bearing unit, and two multi-component force measuring sensors which are disposed on locations spaced apart from each other along an axial direction of the spindle shaft, fixed to the housing, and capable of measuring loads exerted on the spindle shaft is used to measure the load exerted on the spindle shaft, and a calculation step in which a measured load vector consisting of the measured loads obtained in the measurement step is used along with a transformation matrix applied to the measured load vector, to thereby find an actual load vector consisting of actual loads acting on the tire, that comprises selecting, based on a plurality of output values obtained from the two multi-component force measuring sensors, the measured load vector consisting of ten components fx1, fx2, fz1, fz2, fy1, fy2, mx1, mx2, mz1 and mz2, and applying a transformation matrix to the selected measured load vector, to thereby find the actual load vector consisting of five components (Fx, Fy, Fz, Mx, Mz) selected from the actual loads acting on the tire, where fx1, fy1, and fz1 are components of the measured loads in an x axis direction, a y axis direction, and a z axis direction, respectively, which are obtained from one of the two multi-component force sensors, and fx2, fy2, and fz2 are components of the measured loads in the x, y, and z axis directions, respectively, which are obtained from the other one of the two multi-component force sensors, where mx1 and mz1 are components of moments about the x and z axis directions, respectively, which are obtained from the one of the two multi-component force sensors, and mx2 and mz2 are components of moments about the x and z axis directions, respectively, which are obtained from the other one of the two multi-component force sensors, where the x axis direction is a tire traveling direction, the y axis direction is in the axial direction of the spindle shaft, and the z axis direction is a tire loading direction, and wherein the calibration method comprises:

prior to the calculation step, a calibration step of applying the actual load vector whose components are all known to the multi-component force measuring spindle unit in such a manner that ten linearly independent test conditions are established, and determining the measured load vector based on the plurality of output values obtained, under the conditions, from the two multi-component force measuring sensors, calculating the transformation matrix, defined as at least one of a 10 by 5 matrix and a 5 by 10 matrix, which relates the determined measured load vector to the actual load vector whose components are all known, wherein the two multi-component force measuring sensors are adapted to be capable of measuring at least a three-degree-of-freedom translation load exerted on the spindle shaft and measuring at least a moment about a tire traveling direction and a moment about a tire loading direction.

6. The calibration method according to claim 5, further comprising: applying a change in temperature to the multi-component force measuring spindle unit in such a manner that the ten linearly independent test conditions are established.

7. A calibration method for a multi-component force measuring spindle unit applied to a tire testing method, wherein the tire testing method comprises:

a measurement step in which the multi-component force measuring spindle unit including a spindle shaft on which a test tire is adapted to be mounted, a housing for rotatably supporting the spindle shaft via a bearing unit, and two multi-component force measuring sensors which are disposed on locations spaced apart from each other along an axial direction of the spindle shaft, fixed to the housing, and capable of measuring loads exerted on the spindle shaft is used to measure the load exerted on the spindle shaft, and a calculation step in which a measured load vector consisting of the measured loads obtained in the measurement step is used along with a transformation matrix applied to the measured load vector, to thereby find an actual load vector consisting of actual loads acting on the tire, that comprises selecting, based on a plurality of output values obtained from the two multi-component force measuring sensors, the measured load vector consisting of twelve components fx1, fx2, fz1, fz2, fy1, fy2, mx1, mx2, my1, my2, mz1 and mz2, and applying a transformation matrix to the selected measured load vector, to thereby find the actual load vector consisting of five components (Fx, Fy, Fz, Mx, Mz) selected from the actual loads acting on the tire, where fx1, fy1, and fz1 are components of the measured loads in an x axis direction, a y axis direction, and a z axis direction, respectively, which are obtained from one of the two multi-component force sensors, and fx2, fy2, and fz2 are components of the measured loads in the x, y, and z axis directions, respectively, which are obtained from the other one of the two multi-component force sensors, where mx1, my1, and mz1 are components of moments about the x, y, and z axis directions, respectively, which are obtained from the one of the two multi-component force sensors, and mx2, my2, and mz2 are components of moments about the x, y, and z axis directions, respectively, which are obtained from the other one of the two multi-component force sensors, where the x axis direction is a tire traveling direction, the y axis direction is in the axial direction of the spindle shaft, and the z axis direction is a tire loading direction, and wherein the calibration method comprises:

prior to the calculation step, a calibration step of applying the actual load vector whose components are all known to the multi-component force measuring spindle unit in such a manner that twelve linearly independent test conditions are established, and determining the measured load vector based on the plurality of output values obtained, under the conditions, from the two multi-component force measuring sensors, and calculating the transformation matrix, defined as at least one of a 12 by 5 matrix and a 5 by 12 matrix, which relates the determined measured load vector to the actual load vector whose components are all known, wherein the two multi-component force measuring sensors are adapted to be capable of measuring at least a three-degree-of-freedom translation load exerted on the spindle shaft and measuring at least a moment about a tire traveling direction and a moment about a tire loading direction.

8. The calibration method according to claim 7, further comprising: applying a change in temperature to the multi-component force measuring spindle unit in such a manner that the twelve linearly independent test conditions are established.

* * * * *